(12) United States Patent
Varlamov et al.

(10) Patent No.: US 10,261,622 B2
(45) Date of Patent: Apr. 16, 2019

(54) GROUND REFERENCE FLOATING IN A TOUCH-SENSITIVE DISPLAY

(71) Applicant: Microsoft Technology Licensing, LLC, Redmond, WA (US)

(72) Inventors: Denis Varlamov, Portland, OR (US); Yingying Tang, Wilsonville, OR (US); Jonathan Westhues, Portland, OR (US); Tianzhu Qiao, Portland, OR (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 163 days.

(21) Appl. No.: 15/289,852

(22) Filed: Oct. 10, 2016

(65) Prior Publication Data

US 2018/0101273 A1  Apr. 12, 2018

(51) Int. Cl.
*G06F 3/041* (2006.01)
*G06F 3/044* (2006.01)

(52) U.S. Cl.
CPC ............ *G06F 3/0416* (2013.01); *G06F 3/044* (2013.01); *G06F 3/0412* (2013.01); *G06F 2203/04107* (2013.01)

(58) Field of Classification Search
CPC ...... G06F 3/0416; G06F 3/0412; G06F 3/044; G06F 2203/04107
See application file for complete search history.

(56) References Cited

U.S. PATENT DOCUMENTS

| 6,400,359 | B1 | 6/2002 | Katabami |
|---|---|---|---|
| 8,228,311 | B2 | 7/2012 | Perski et al. |
| 8,432,371 | B2 | 4/2013 | Hotelling et al. |
| 8,487,898 | B2 | 7/2013 | Hotelling |

(Continued)

FOREIGN PATENT DOCUMENTS

| CN | 102338945 A | 2/2012 |
|---|---|---|
| CN | 102341774 A | 2/2012 |
| CN | 103186297 A | 7/2013 |

OTHER PUBLICATIONS

Osoinach, Bryce, "Proximity Capacitive Sensor Technology for Touch Sensing Applications", In White Paper of Freescale, Mar. 13, 2012, 12 pages.

(Continued)

*Primary Examiner* — Andrew Sasinowski
(74) *Attorney, Agent, or Firm* — Alleman Hall Creasman & Tuttle LLP (57) ABSTRACT

Examples are described for touch-sensitive displays in which ground references for associated electronics are isolated from one another. In one example, a touch-sensitive display includes a display panel, and a touch sensor, the touch sensor including a receive electrode, the touch sensor including a transmit electrode, the receive electrode and the transmit electrode overlaying the display panel, and wherein a ground reference of the receive and/or the transmit electrode is isolated from a ground reference of the display panel, thereby creating a transmission-inhibiting communication boundary between the display panel and the touch sensor, the touch sensor communicatively connected to the display panel so as to exchange data between ground domains separated by the boundary.

20 Claims, 6 Drawing Sheets

(56) References Cited

U.S. PATENT DOCUMENTS

| | | | |
|---|---|---|---|
| 8,573,984 | B2 | 11/2013 | Miller |
| 8,614,690 | B2 | 12/2013 | Grunthaner et al. |
| 2003/0067449 | A1 | 4/2003 | Yoshikawa et al. |
| 2010/0044122 | A1 | 2/2010 | Sleeman et al. |
| 2010/0079401 | A1 | 4/2010 | Staton |
| 2013/0328829 | A1* | 12/2013 | Lee ................ G06F 3/0412 345/174 |
| 2014/0152621 | A1* | 6/2014 | Okayama .......... G06F 3/0416 345/174 |
| 2014/0152918 | A1 | 6/2014 | Lee |
| 2014/0225859 | A1 | 8/2014 | Badaye et al. |
| 2015/0363012 | A1* | 12/2015 | Sundara-Rajan ..... G06F 3/038 345/179 |
| 2016/0085342 | A1 | 3/2016 | Mohapatra et al. |
| 2016/0170522 | A1 | 6/2016 | Slobodin et al. |
| 2016/0170533 | A1* | 6/2016 | Roziere ............... G06F 3/044 345/174 |

OTHER PUBLICATIONS

"International Search Report and Written Opinion Issued in PCT Application No. PCT/US2017/054809", dated Jan. 4, 2018, 12 Pages.

* cited by examiner

GROUND REFERENCE FLOATING IN A TOUCH-SENSITIVE DISPLAY

BACKGROUND

Display devices may incorporate touch-sensitive circuitry to sense objects that come within a threshold range (or in contact with) a surface of the display device.

DETAILED DESCRIPTION

Figure 1:
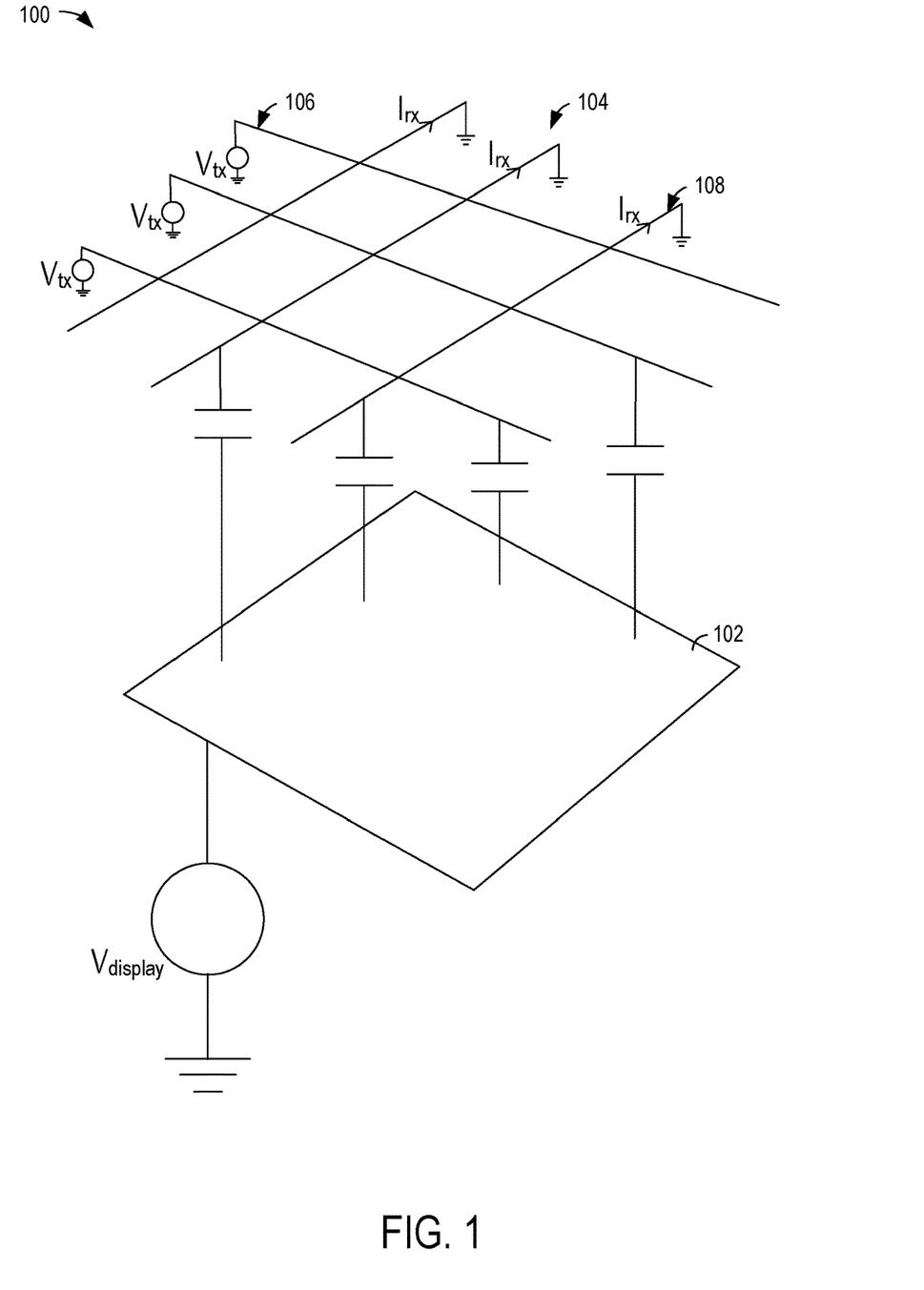
FIG. 1 shows an example configuration of electrical components in a touch-sensitive display.

Touch-sensitive displays may be incorporated in a variety of electronic devices, such as mobile phones, tablets, and dynamic touch pads. FIG. 1 shows an example of a capacitive touch display device 100, in which a display 102 (e.g., an LCD, OLED, or other display) may be optically bonded (e.g., attached with a thin layer of transparent adhesive) to a capacitive touch sensor 104. The capacitive touch sensor 104 may include row 106 and column 108 electrodes in a two-dimensional matrix. These rows and columns may be attached to touch controller electronics used to measure sensor capacitances. In other example configurations, the display and touch controller electronics share common ground, with potential equal to that of earth ground. Operation of the capacitive touch sensor utilizes an electrical connection between the user's body and that ground node, which is typically supplied both by capacitance from the user's body to the display itself (e.g., to the display's chassis, or to grounded rows or columns in the sensor matrix), and by capacitance to other conductive objects that share this ground (e.g., through power mains and associated safety grounding). For example, the voltage sources $V_{tx}$ for driving the transmitting electrodes, the voltage source $V_{display}$ for driving the display, and the receiving electrodes may all share the same ground reference. The display devices described herein instead include a capacitive touch display where the display and touch sensor do not share a common ground.

In some systems, a single computer may interface to both the touch sensor and the display. Protocols for this interface may include Universal Serial Bus (USB), DisplayPort, and/or other protocols that utilize a common ground, and such use would therefore connect any isolated grounds, losing the benefit of this technique. Accordingly, systems of the present disclosure may interface to the display and/or to the touch sensor with a protocol that does not utilize this common ground. While either the touch sensor or the display may be "floated" (e.g., isolated from the ground utilized by the remaining elements of the display device/computing system), the illustrated examples described herein use an isolating protocol for the touch sensor, since the bandwidth of that link from the touch sensor to the display and/or remaining electronics of the device is much lower (e.g., the link from the touch sensor to the display and/or remaining electronics of the device may have a bandwidth that is less than 10 Mbit/s, while the link from the display to the touch sensor and/or remaining elements of the device may have a bandwidth of 1 Gbit/s or greater). In other examples (e.g., where more data is exchanged between the touch sensor and the device electronics than between the display and the device electronics), the display ground may be isolated in a similar manner to those described herein with respect to the touch sensor.

Other systems may couple the ground references of the touch sensor and the display, since it is expected that if the display is kept at earth ground, while the touch sensor ground is floated or otherwise isolated from the display (and thus from earth ground), then the apparent change in capacitance upon touching the touch sensor will decrease greatly. Such an expectation is held since there is no longer an explicit connection between the user's body and the touch sensor ground in the above example. However, in an optically-bonded capacitive touch display, a large capacitance may exist between each sensor row and column and the display (e.g., ~100 pF per electrode, or ~30 nF total for a ~55" diagonal display, at a typical sensor pitch around 6 mm). Since most electrodes of that matrix are held at AC ground or AC virtual ground, the user is effectively grounded through that capacitance, which is many orders of magnitude larger than the capacitances under test. In other words, the user-to-sensor impedance may be orders of magnitude smaller than the touch sensor-to-display panel capacitance. For this reason, the user may be considered to effectively be at a common reference with the touch sensor and display panel for purposes of touch sensor input evaluation, even when the touch sensor has a different ground domain than the display panel.

The isolation of ground references may be achieved via different mechanisms, as described below. In a first example, shown in FIG. 2, the touch sensor may share ground with the display at direct current (DC), but frequency-selective circuits (e.g., inductive chokes) may isolate the grounds at frequencies used to measure capacitance (e.g., 10 kHz to 10 MHz). In a second example, shown in FIG. 3, the display may be powered from the mains as usual, and the touch sensor may be powered from a battery. In a third example, shown in FIG. 4, the touch sensor may be powered from a separate transformer-isolated power supply, where that transformer is designed to minimize capacitive coupling between the primary and secondary windings.

Figure 2:
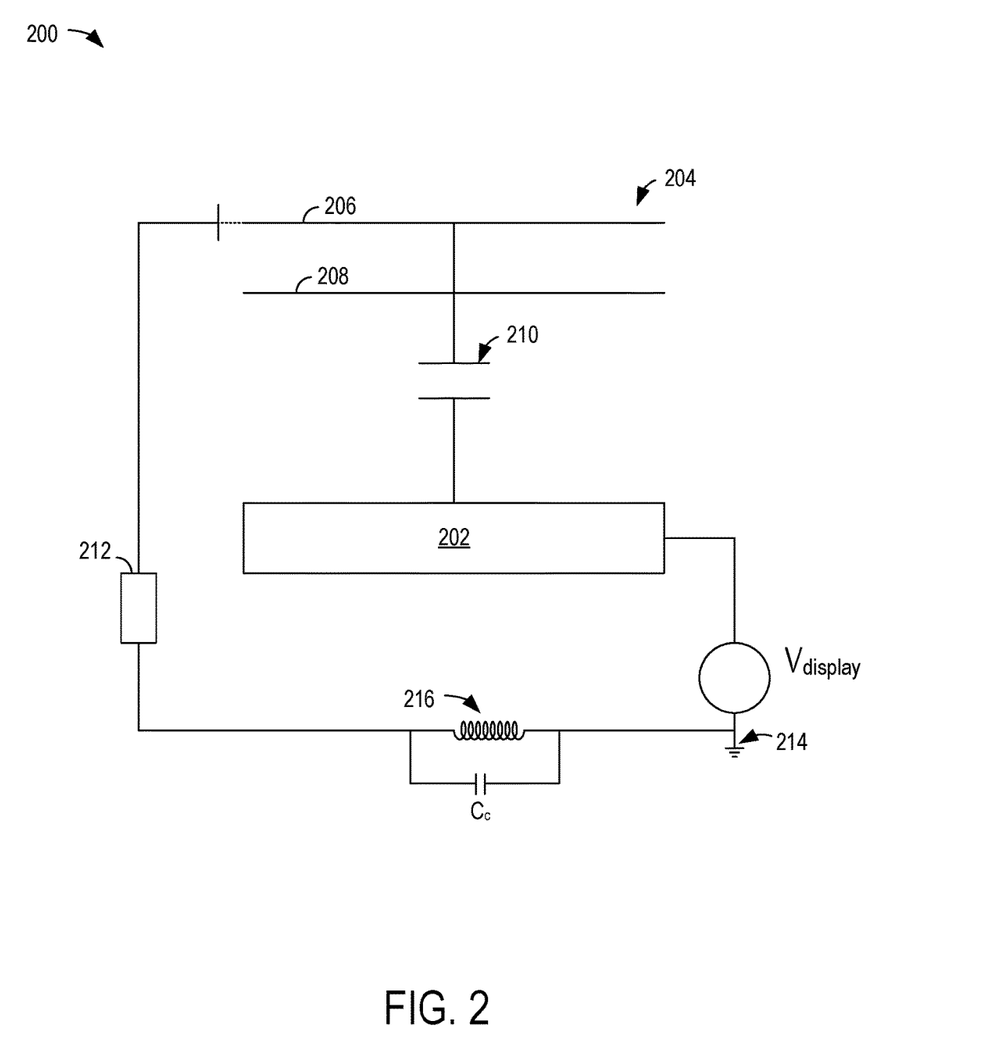
FIG. 2 shows an example configuration for isolating ground references in a touch-sensitive display using a frequency-selective inductive choke.

Turning to FIG. 2, an example schematic diagram of a touch sensitive display device 200 is illustrated. The touch-sensitive display device 200 includes a display panel 202 and a touch sensor 204 including a receive electrode 206 and a transmit electrode 208. The receive electrode 206 and the transmit electrode 208 are each coupled to the display panel 202 via a capacitance (represented at 210) for measuring touch input.

The receive electrode 206 is coupled to touch subsystem electronics 212. The display panel 202 is coupled to a voltage source represented by $V_{display}$ in FIG. 2. Each of the touch subsystem electronics 212 and the display panel 202 are coupled to a common ground (represented at 214) at DC, however a frequency-selective choke 216 isolates the touch subsystem electronics 212 from the ground reference 214 at selected operating frequencies. The choke 216 may isolate transmit and/or receive electronics of the touch subsystem electronics. For example, isolating the transmit electronics may minimize the effect of high transmit voltage on a display image. The choke 216 may include an inductor and/or other inductive component that is connected between the touch subsystem electronics 212 and the display panel 202 (e.g., between the touch subsystem electronics 212 and the ground reference 214 of the display panel). The properties of the choke 216 are selected to isolate the ground reference of the touch subsystem electronics 212 (and thus the ground reference of the touch sensor 204) from the ground reference of the display panel 202, creating two different ground domains, when the display circuit is operating at frequencies used to measure capacitance (e.g., at operating frequencies of the row driver of the touch sensor). The operating frequencies of the row driver may include the line scan frequency (e.g., how many rows are driven per second), which may include a range of transmit signal frequencies from 100 kHz to 1 MHz. For example, the sensor framerate may be on the order of 60 Hz to 240 Hz, and the electrode timing is dependent on the number of electrodes and the number of times the electrode is scanned per frame. The operating frequency is different than the frequency of the signals that are actually used to drive the rows. The frequency of the signals that are used to drive the rows (e.g., high-frequency pulse trains) is orders of magnitude higher than the line scan frequency. The frequency selective circuits may be configured to present a very high impedance between the ground domains at those operating frequencies. The low impedance at DC may create a return current path for the power supply used to power the touch input system.

The inductive choke may thus create a transmission-inhibiting communication boundary between the display panel and the touch sensor (and between the touch sensor and other electronics of the display device 200). The boundary may be defined by the presence of a higher impedance between the touch sensor and the display panel than would exist if the two components shared a common reference (e.g., shared a common reference at all frequencies). In the example of FIG. 2, the boundary may be defined by the presence of the higher impedance at specific frequencies (e.g., the operating frequencies of the touch sensor), which may be selected in relation to a coupling capacitance represented as $C_c$.

Figure 3:
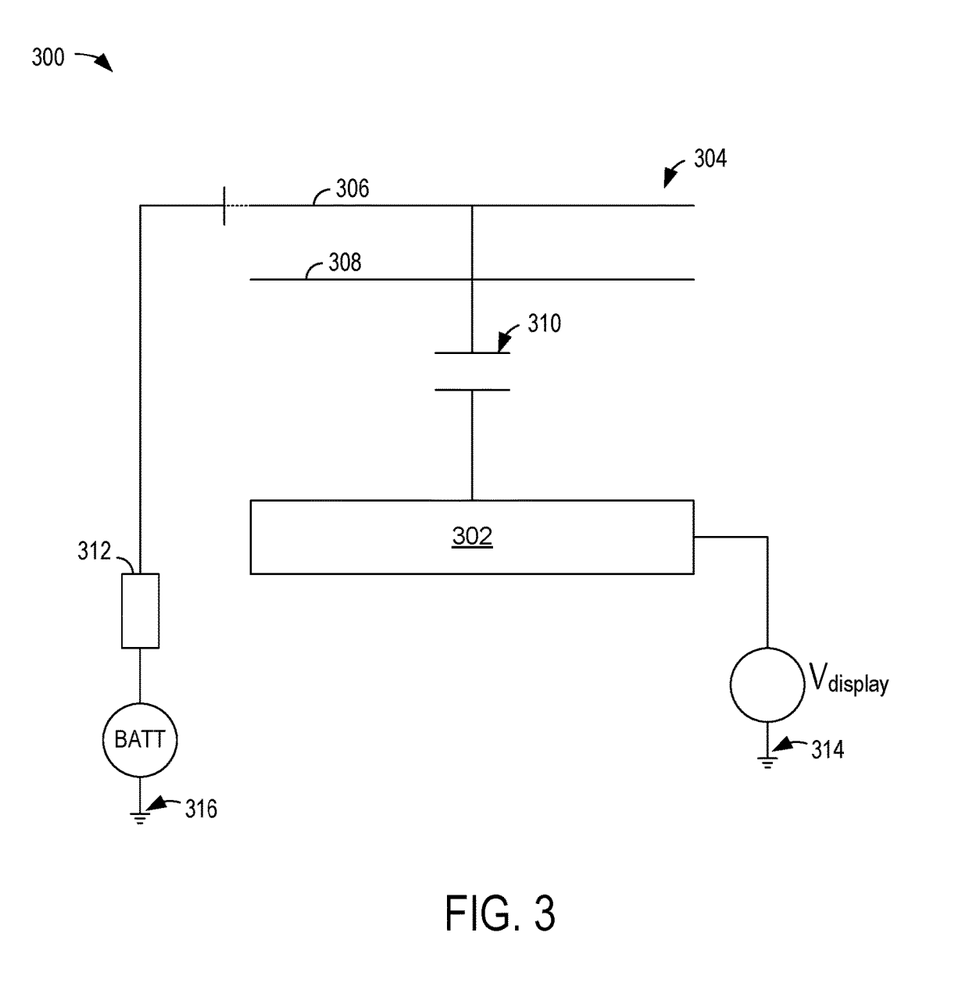
FIG. 3 shows an example configuration for isolating ground references in a touch-sensitive display using different voltage sources.

FIG. 3 shows a schematic diagram of an example touch sensitive display device 300. The touch-sensitive display device 300 includes a display panel 302 and a touch sensor 304 including a receive electrode 306 and a transmit electrode 308. The receive electrode 306 and the transmit electrode 308 are each coupled to the display panel 302 via a capacitance (represented at 310) for measuring touch input. The receive electrode and the transmit electrode may be part of a touch sensing matrix, which may include tens or hundreds of such receive and/or transmit electrodes.

The receive electrode 306 is coupled to touch subsystem electronics 312. The display panel 302 is coupled to a voltage source represented by $V_{display}$, which may represent a first, or primary power supply. The touch subsystem electronics 312 are illustrated as being coupled to a second, different power supply, which includes a battery, BATT, in the example of FIG. 3. In other examples, any suitable power supply and/or voltage source may be coupled to the touch subsystem electronics 312 to power the touch subsystem electronics. The different power supplies/voltage sources thereby isolate the ground reference of the display panel 302, as shown at 314, from the ground reference of the touch subsystem electronics 312 (and thus the ground reference of the touch sensor 304), as shown at 316, creating two different ground domains (e.g., where each ground domain includes circuit elements grounded by a same ground reference).

Figure 4:
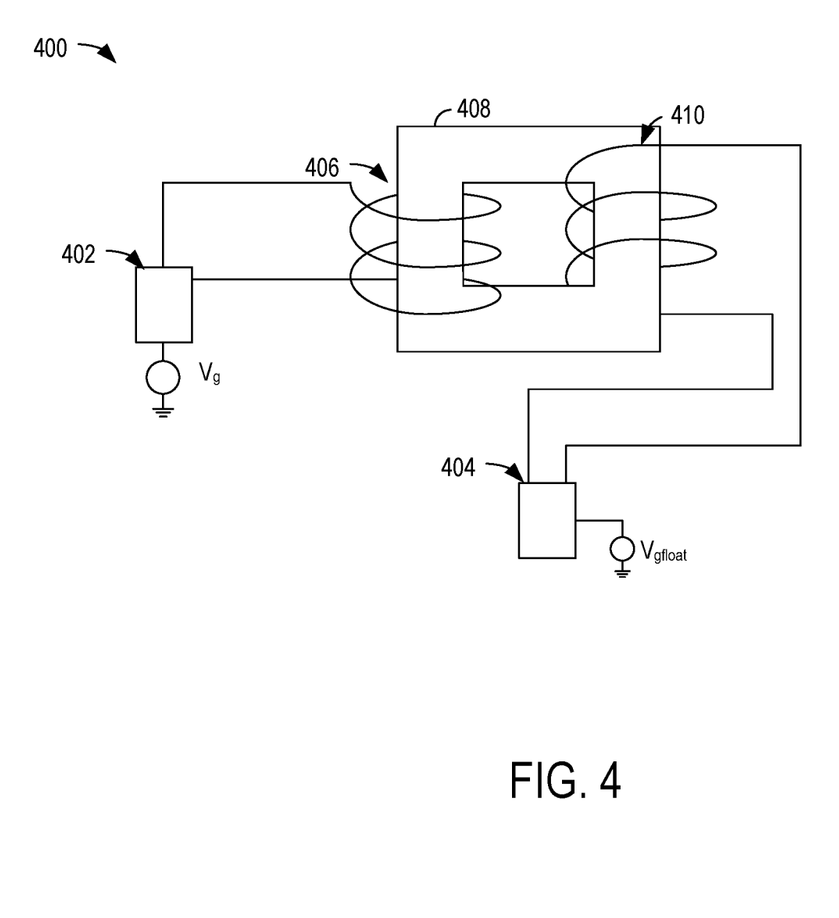
FIG. 4 shows an example configuration for isolating ground references in a touch-sensitive display using a transformer-isolated power supply.

FIG. 4 shows a schematic diagram of an example touch sensitive display device 400 that utilizes a transformer-isolated power supply to isolate ground domains. The touch-sensitive display device 400 includes a display panel 402 and a digitizer 404 for a touch sensor. The digitizer 404 may include and/or be included in touch subsystem electronics for a touch sensor, such as touch sensor 104 of FIG. 1, 204 of FIG. 2, and/or 304 of FIG. 3, to digitize signals received from the touch sensor for use in detecting touch inputs at a receive electrode of the touch sensor. The display panel 402 is coupled to a first (e.g., primary) set of windings 406 of a transformer core 408 and to a voltage source $V_g$. The digitizer 404 is coupled to a second, opposing (e.g., secondary) set of windings 410 of the transformer core 408 and to a voltage source $V_{gfloat}$. The different power supplies/voltage sources are separated by the transformer core 408, thereby isolating the ground reference of the display panel 402 from the ground reference of the digitizer 404 (and thus the ground reference of the touch sensor), creating two different ground domains. The transformer may be configured to minimize capacitive coupling between the primary and secondary sides/windings at selected frequencies (e.g., operating frequencies).

In each of the ground isolation examples described in the present disclosure, one or more techniques to exchange data between ground domains separated by the boundary may be employed. For example, the ground-isolating protocol may use an opto-coupler (e.g., an optical data exchange mechanism) and/or transformer isolation. The optical data exchange mechanism may include a light emitter or other optical transmission mechanism configured to transmit data from one ground domain (e.g., the touch sensor ground domain) to a light detector or other optical detection mechanism in another ground domain (e.g., the display panel ground domain). The optical transmission mechanism thus converts electrical data into light, while the optical detection mechanism converts the light into electrical data (e.g., recovers the electrical data from the received light). In such an example, the data is exchanged via a different communication path (e.g., around the boundary) that enables communication between the ground domains.

The transformer isolation example may include transmitting data from one side of a transformer core (e.g., from a primary winding side) to another side of a transformer core (e.g., to an opposing secondary winding side). In such an example, the transformer core may itself form the boundary between the ground domains, such that the communication is exchanged across that boundary. In additional or alternative examples, the two systems' grounds may be connected at frequencies much higher than those used to measure capacitance (e.g., greater than a data transmission frequency, such as 100 MHz), and the data may be AC-coupled across the ground domains, with a coding scheme (e.g., Manchester encoding) that guarantees that all energy in the signal will lie above that cutoff frequency.

In some examples, a stylus may be used to provide input instead of a user's finger or other body part. In systems where a digitizer of a touch sensor transmits data electrostatically from the digitizer to an active capacitive stylus, an "uplink" waveform may be applied on all rows and columns (or many rows and columns, uniformly over the area of the display) of the touch sensor simultaneously. The application of this "uplink" waveform changes the reference voltage associated with the touch sensor electrode matrix so that it is significantly different from the user body ground. This effectively un-grounds the user, reducing the current received by a stylus held by that user to almost zero. A stylus that depends on this uplink (e.g., a stylus that uses this uplink for time synchronization) therefore doesn't work. An example scenario in which the above-described situation may occur includes a condition in which an active stylus is synchronizing with the display. In this case, the stylus may receive a signal no matter where the stylus is positioned across the display, so multiple rows (e.g., every third row across the entire electrode matrix) may be activated/driven.

Another example scenario includes a condition in which data is being transmitted from the display to the stylus. Again, the stylus may receive the signal no matter where the stylus is positioned on the display by activating multiple rows. When performing such an "uplink," if the same waveform is driven on each row, the reference voltage on the electrode matrix is changed so that the reference voltage is significantly different from the user body ground, thereby reducing or eliminating the effectiveness of sensing touch input from the user. Furthermore, the current into the stylus will be much lower than under other operating conditions, thereby reducing or stopping the operation of the stylus.

To address the above-described effects, a switch (e.g. a FET) may be placed between the two isolated grounds, and closed whenever the digitizer transmits an uplink sequence for the active stylus. The use of the switch may reduce the display panel noise benefit (e.g., the noise decrease) of isolated grounds. If that noise benefit is still desired (e.g., if the same timeslot is used simultaneously for that uplink and to measure capacitance from row and column electrodes to ground), then different uplink waveforms may be used in different regions of the display, with the waveforms chosen so that, when weighted by the capacitances from the matrix electrodes on which they're applied to the display, the waveforms sum to an average of zero over the integration period.

If a single uplink waveform is to be used on all electrodes of the display, then another approach includes maintaining the isolated grounds under all conditions, and injecting a current from touch sensor ground to display ground that is equal in magnitude and opposite in sign to the current injected by the capacitances from display ground to the rows and columns excited with the uplink waveform. The magnitude of the current used to achieve the above-described condition may be set once at design time of the touch-sensitive display, calibrated on each display at the factory (e.g., to model variation in the optical bond line thickness, which affects the capacitances through which the to-be-cancelled current flows), or calibrated continuously and dynamically during use of the display (e.g., to correct for the temperature coefficient of those capacitances). The current may be injected by applying a voltage across a fixed impedance (e.g., a fixed capacitor), or with an active current source, or by other current injection mechanisms.

Figure 5:
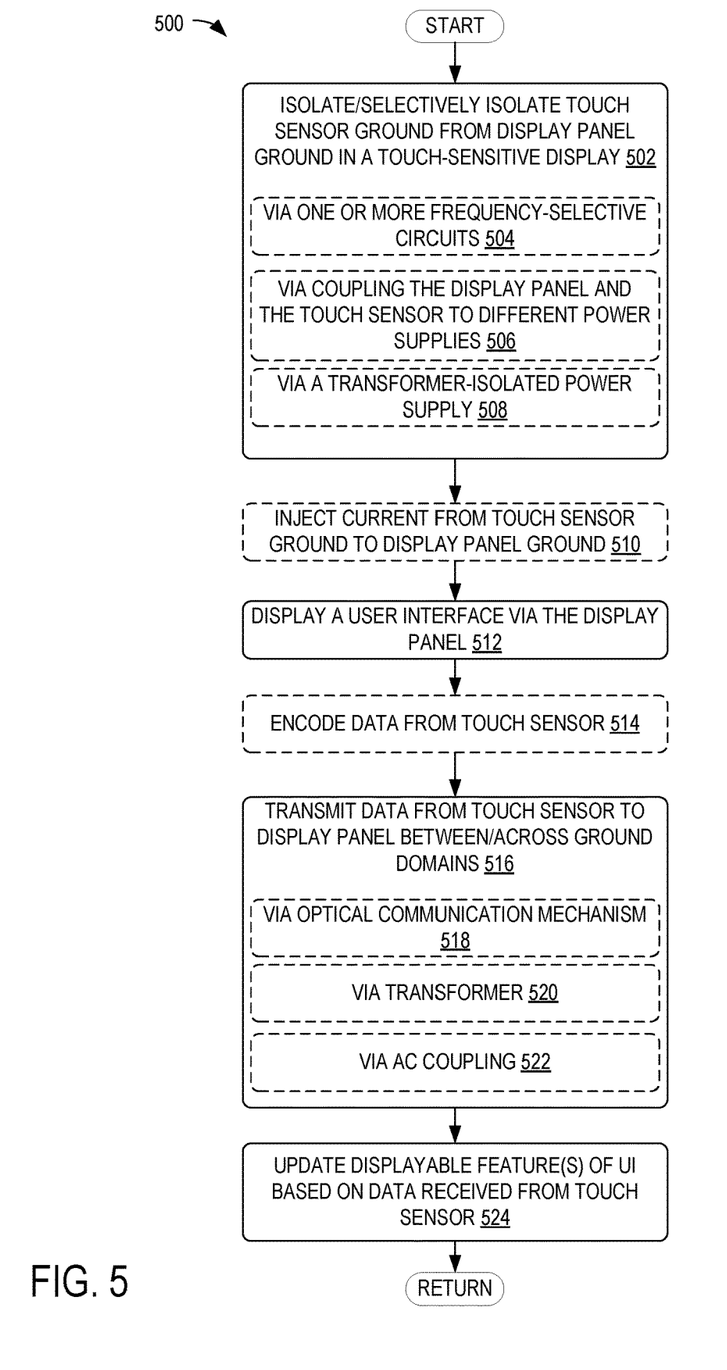
FIG. 5 shows a flow chart of an example method of operating a touch-sensitive display device with isolated ground references.

FIG. 5 shows a flow chart for an example method 500 of operating a touch-sensitive display. For example, method 500 may be performed by one or more elements of the touch-sensitive display devices 100 of FIG. 1, 200 of FIG. 2, 300 of FIG. 3, and/or 400 of FIG. 4. At 502, the method includes isolating or selectively isolating a touch sensor ground of a touch-sensitive display device from a display panel ground of the touch-sensitive display device. For example, the isolation may be performed via one or more frequency-selective circuits, as indicated at 504, and as described above with respect to FIG. 2. The isolation may additionally or alternatively be performed via coupling the display panel and the touch sensor to different (e.g., independent and decoupled) power supplies, as indicated at 506, and as described above with respect to FIG. 3. The isolation may additionally or alternatively be performed via a transformer-isolated power supply, as indicated at 508, and as described above with respect to FIG. 4.

At 510, the method optionally includes injecting a current from the touch sensor ground to the display panel ground. For example, a current-injection may be performed when a stylus is used for touch input and a single waveform is to be provided to drive multiple rows and/or columns of the touch sensor for communicating with the stylus, as described in more detail above. At 512, the method includes displaying a user interface via the display panel. For example, the user interface may respond to inputs received via the touch sensor and/or may control operations of the touch-sensitive display device.

At 514, the method optionally includes encoding data from the touch sensor (e.g., prior to transmitting the data). As will be described below, data may be encoded to enable transport over a communication path that traverses both ground domains of the touch-sensitive display.

At 516, the method includes transmitting data from the touch sensor to the display panel between and/or across the ground domains of the touch sensor and the display panel. As indicated at 518, the transmission may be performed via an optical communication mechanism (e.g., where the data is encoded and transmitted as light on the touch sensor-end, and received and decoded as electrical information on the display panel-end). The transmission may additionally or alternatively be performed via a transformer (e.g., where the data is transmitted via a magnetic field of the transformer), as indicated at 520. In additional or alternative examples, the transmission may be performed via AC coupling across ground domains of the touch sensor ground and the display panel ground, as indicated at 522, where the data is encoded with a coding scheme prior to transmitting the data across the ground domains (e.g., at 510), the coding scheme generating a signal that is above a selected frequency. At 524, the method includes updating one or more displayable features of the user interface based at least on data received from the touch sensor. For example, the touch sensor data may indicate a location of touch input, which may control the touch-sensitive display device to update the user interface displayed on the display panel to show a selection made at the location of touch input reported by the touch sensor.

The above-described methods for isolating grounds may introduce cost and complexity into computing devices. However, by isolating the display and touch sensor grounds, a large impedance may be inserted in series with the loop through which any noise current coupled from the display into the touch sensor (or vice versa) travels. Such impedance may dramatically (e.g., by a factor of more than ten) reduce the amplitude of noise coupled into the touch sensor by the display (and vice versa). In large, optically-bonded capacitive touch displays, the display is the most important noise source in the system, so this reduction may be significant, enabling the system to report a lower-noise finger or stylus position, to operate at higher frame rates, or to operate at lower excitation voltage for the same signal-to-noise ratio. The ground isolation described herein may also minimize the touch sensor system's signal coupling into the display (which may disrupt the operation of the display). Accordingly, these advantages may reduce total system cost, or improve performance, relative to other systems that do not isolate the grounds of the display and the touch sensor, thereby offsetting the cost and complexity introduced by the isolation circuitry. By isolating the grounds, the inductance of the return path of any current coupled into the display (which may only have capacitive coupling to the sensor, and may not include, for example, a path through the display's row and column drivers to the display's TCON board/timing control electronics) may also be changed. Such change may have the technical effect of significantly increasing the useful bandwidth of the sensor, decreasing integration time, (and thus increasing frame rate) and/or increasing signal-to-noise ratio relative to those encountered in systems that do not include isolated display and touch sensor grounds.

In some embodiments, the methods and processes described herein may be tied to a computing system of one or more computing devices. In particular, such methods and processes may be implemented as a computer-application program or service, an application-programming interface (API), a library, and/or other computer-program product.

Figure 6:
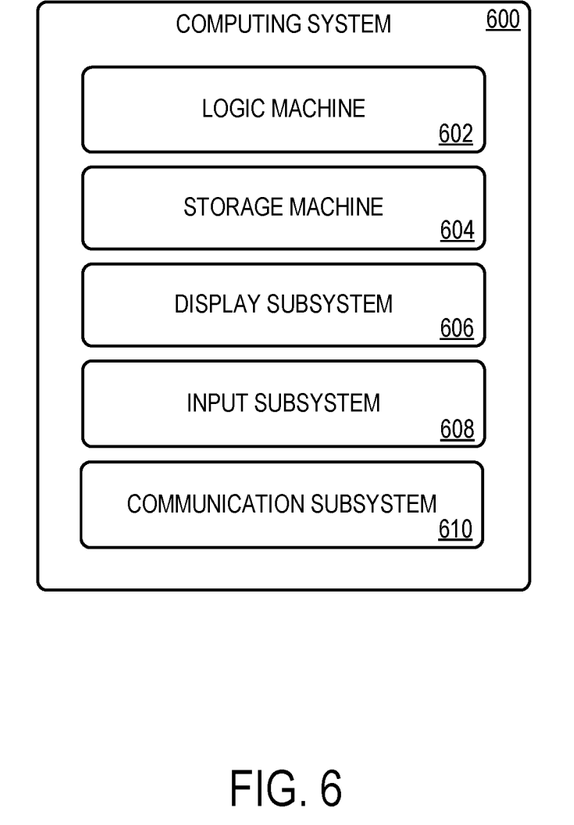
FIG. 6 shows a block diagram of an example computing device.

FIG. 6 schematically shows a non-limiting embodiment of a computing system 600 that can enact one or more of the methods and processes described above. Computing system 600 is shown in simplified form. Computing system 600 may take the form of one or more personal computers, server computers, tablet computers, home-entertainment computers, network computing devices, gaming devices, mobile computing devices, mobile communication devices (e.g., smart phone), and/or other computing devices.

Computing system 600 includes a logic machine 602 and a storage machine 604. Computing system 600 may optionally include a display subsystem 606, input subsystem 608, communication subsystem 610, and/or other components not shown in FIG. 6.

Logic machine 602 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 604 includes one or more physical devices configured to hold instructions executable by the logic machine to implement the methods and processes described herein. When such methods and processes are implemented, the state of storage machine 604 may be transformed—e.g., to hold different data.

Storage machine 604 may include removable and/or built-in devices. Storage machine 604 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 604 may include volatile, nonvolatile, dynamic, static, read/write, read-only, random-access, sequential-access, location-addressable, file-addressable, and/or content-addressable devices.

It will be appreciated that storage machine 604 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 602 and storage machine 604 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 600 implemented to perform a particular function. In some cases, a module, program, or engine may be instantiated via logic machine 602 executing instructions held by storage machine 604. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 606 may be used to present a visual representation of data held by storage machine 604. This visual representation may take the form of a graphical user interface (GUI). As the herein described methods and processes change the data held by the storage machine, and thus transform the state of the storage machine, the state of display subsystem 606 may likewise be transformed to visually represent changes in the underlying data. Display subsystem 606 may include one or more display devices utilizing virtually any type of technology. For example, display subsystem may include one or more of the components illustrated in FIGS. 1-4 for isolating a display panel ground from a touch sensor ground. Such display devices may be combined with logic machine 602 and/or storage machine 604 in a shared enclosure, or such display devices may be peripheral display devices.

When included, input subsystem 608 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity. For example, the input subsystem 608 may include one or more of the example touch sensors illustrated in FIGS. 1-4.

When included, communication subsystem 610 may be configured to communicatively couple computing system 600 with one or more other computing devices. Communication subsystem 610 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 600 to send and/or receive messages to and/or from other devices via a network such as the Internet.

Another example provides for a touch-sensitive display, comprising a display panel, and a touch sensor, the touch sensor including a receive electrode, the touch sensor including a transmit electrode, the receive electrode and the transmit electrode overlaying the display panel, and wherein a ground reference of one or more of the receive electrode and the transmit electrode is isolated from a ground reference of the display panel, thereby creating a transmission-inhibiting communication boundary between the display panel and the touch sensor, the touch sensor communicatively connected to the display panel so as to exchange data between ground domains separated by the boundary. In such an example, the touch sensor may additionally or alternatively be configured to drive the transmit electrode via a signal within a selected range of operating frequencies to measure a capacitance that changes responsive to touch input to the touch sensor, and the touch-sensitive display may additionally or alternatively further comprise one or more frequency-selective circuits configured to isolate the ground references for the display panel and the touch sensor at the selected range of operating frequencies used to measure the capacitance. In such an example, the display panel may additionally or alternatively be powered by a first power supply and the touch sensor may additionally or alternatively be powered by a second, different power supply, the second power supply including a battery. In such an example, the touch sensor may additionally or alternatively be powered from a transformer-isolated power supply when installed in the touch-sensitive display, the transformer-isolated power supply being connected to the touch sensor via a first set of windings around a transformer core, and to the display panel via a second, opposing set of windings around the transformer core. In such an example, the touch sensitive display may additionally or alternatively further comprise a current injection mechanism for selectively injecting a current from a touch sensor ground to a display panel ground. In such an example, the touch sensor may additionally or alternatively be communicatively connected to the display panel to exchange data between ground domains separated by the boundary via an optical transmission mechanism. In such an example, the touch sensor may additionally or alternatively be communicatively connected to the display panel to exchange data between ground domains separated by the boundary via a transformer. In such an example, a touch sensor ground may additionally or alternatively be connected to a display panel ground at a selected frequency that is higher than 100 MHz, and wherein the touch sensor is communicatively connected to the display panel to exchange data via an alternating current coupling across the ground domains of the touch sensor ground and the display panel ground. In such an example, the data may additionally or alternatively be encoded with a coding scheme prior to transmitting the data across the ground domains of the touch sensor ground and the display panel ground, the coding scheme generating a signal that is above the selected frequency. Any or all of the above-described examples may be combined in any suitable manner in various implementations.

Another example provides for, in a touch sensitive display, a method of exchanging information between a touch sensor and a display panel, the method comprising transmitting data from the touch sensor to the display panel between ground domains separated by a transmission-inhibiting communication boundary, a touch sensor ground being isolated form a display panel ground via the boundary. In such an example, the method may additionally or alternatively further comprise driving a transmit electrode of the touch sensor via a signal within a selected range of operating frequencies to measure a capacitance that changes responsive to touch input to the touch sensor, and selectively isolating the touch sensor ground from the display panel ground based at least on the selected range of operating frequencies of the touch sensor via one or more frequency-selective circuits, the one or more frequency-selective circuits configured to isolate the touch sensor ground from the display panel ground at the selected range of operating frequencies used to measure the capacitance. In such an example, the method may additionally or alternatively further comprise supplying power to the display panel via a first power supply and supplying power to the touch sensor via a second, different power supply, the second power supply including a battery. In such an example, the method may additionally or alternatively further comprise supplying power to the display panel via a first set of windings around a transformer core of a transformer-isolated power supply, and supplying power to the touch sensor via a second, opposing set of windings around the transformer core. In such an example, the method may additionally or alternatively further comprise injecting a current from the touch sensor ground to the display panel ground. In such an example, transmitting data from the touch sensor to the display panel may additionally or alternatively comprise transmitting data from an optical transmission mechanism of the touch sensor to a light detector of the display panel. In such an example, transmitting data from the touch sensor to the display panel may additionally or alternatively comprise transmitting data via an alternating current coupling across ground domains of the touch sensor ground and the display panel ground. In such an example, the method may additionally or alternatively further comprise encoding the data with a coding scheme prior to transmitting the data across the ground domains, the coding scheme generating a signal that is above a selected frequency. Any or all of the above-described examples may be combined in any suitable manner in various implementations.

Another example provides for a computing device comprising a display panel coupled to a display panel ground, a touch sensor including a receive electrode and a transmit electrode overlaying the display panel, the transmit electrode being driven via a signal within a selected range of operating frequencies to measure a capacitance that changes responsive to touch input to the touch sensor, and one or more of the transmit electrode and the receive electrode being coupled to a touch sensor ground that is isolated from the display panel ground by one or more frequency-selective circuits configured to isolate the display panel ground and the touch sensor ground at the selected range of operating frequencies used to measure the capacitance, a logic subsystem, and a storage device storing instructions executable by the logic subsystem to display a user interface via the display panel, receive data from the touch sensor that is transmitted between ground domains of the display panel ground and the touch sensor ground, and update at least one displayable feature of the user interface based at least on the data received from the touch sensor. In such an example, the touch sensor ground may additionally or alternatively be connected to the display panel ground at a selected frequency that is higher than a data transfer frequency, and wherein the touch sensor is communicatively connected to the display panel to exchange data via an alternating current coupling across the ground domains of the touch sensor ground and the display panel ground. In such an example, the data may additionally or alternatively be encoded with a coding scheme prior to transmitting the data across the ground domains of the touch sensor ground and the display panel ground, the coding scheme generating a signal that is above the selected frequency. Any or all of the above-described examples may be combined in any suitable manner in various implementations.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A touch-sensitive display, comprising:
    a display panel; and
    a touch sensor;
    the touch sensor including a receive electrode;
    the touch sensor including a transmit electrode, the receive electrode and the transmit electrode overlaying the display panel; and
    wherein a ground reference of one or more of the receive electrode and the transmit electrode is isolated from a ground reference of the display panel, thereby creating a transmission-inhibiting communication boundary between the display panel and the touch sensor, the touch sensor communicatively connected to the display panel so as to exchange data between ground domains separated by the boundary.

2. The touch-sensitive display of claim 1, wherein the touch sensor is configured to drive the transmit electrode via a signal within a selected range of operating frequencies to measure a capacitance that changes responsive to touch input to the touch sensor, the touch-sensitive display further comprising one or more frequency-selective circuits configured to isolate the ground references for the display panel and the touch sensor at the selected range of operating frequencies used to measure the capacitance.

3. The touch-sensitive display of claim 1, wherein the display panel is powered by a first power supply and the touch sensor is powered by a second, different power supply, the second power supply including a battery.

4. The touch-sensitive display of claim 1, wherein the touch sensor is powered from a transformer-isolated power supply, the transformer-isolated power supply being connected to the touch sensor via a first set of windings around a transformer core, and to the display panel via a second, opposing set of windings around the transformer core.

5. The touch sensitive display of claim 1, further comprising a current injection mechanism for selectively injecting a current from a touch sensor ground to a display panel ground.

6. The touch sensitive display of claim 1, wherein the touch sensor is communicatively connected to the display panel to exchange data between ground domains separated by the boundary via an optical transmission mechanism.

7. The touch sensitive display of claim 1, wherein the touch sensor is communicatively connected to the display panel to exchange data between ground domains separated by the boundary via a transformer.

8. The touch sensitive display of claim 1, wherein a touch sensor ground is connected to a display panel ground at a selected frequency that is higher than 100 MHz, and wherein the touch sensor is communicatively connected to the display panel to exchange data via an alternating current coupling across the ground domains of the touch sensor ground and the display panel ground.

9. The touch sensitive display of claim 8, wherein the data is encoded with a coding scheme prior to transmitting the data across the ground domains of the touch sensor ground and the display panel ground, the coding scheme generating a signal that is above the selected frequency.

10. In a touch sensitive display, a method of exchanging information between a touch sensor and a display panel, the method comprising:
    transmitting data from the touch sensor to the display panel between ground domains separated by a transmission-inhibiting communication boundary, a touch sensor ground being isolated from a display panel ground via the boundary.

11. The method of claim 10, further comprising driving a transmit electrode of the touch sensor via a signal within a selected range of operating frequencies to measure a capacitance that changes responsive to touch input to the touch sensor, and selectively isolating the touch sensor ground from the display panel ground based at least on the selected range of operating frequencies of the touch sensor via one or more frequency-selective circuits, the one or more frequency-selective circuits configured to isolate the touch sensor ground from the display panel ground at the selected range of operating frequencies used to measure the capacitance.

12. The method of claim 10, further comprising supplying power to the display panel via a first power supply and supplying power to the touch sensor via a second, different power supply, the second power supply including a battery.

13. The method of claim 10, further comprising supplying power to the display panel via a first set of windings around a transformer core of a transformer-isolated power supply, and supplying power to the touch sensor via a second, opposing set of windings around the transformer core.

14. The method of claim 10, further comprising injecting a current from the touch sensor ground to the display panel ground.

15. The method of claim 10, wherein transmitting data from the touch sensor to the display panel comprises transmitting data from an optical transmission mechanism of the touch sensor to a light detector of the display panel.

16. The method of claim 10, wherein transmitting data from the touch sensor to the display panel comprises transmitting data via an alternating current coupling across ground domains of the touch sensor ground and the display panel ground.

17. The method of claim 16, further comprising encoding the data with a coding scheme prior to transmitting the data across the ground domains, the coding scheme generating a signal that is above a selected frequency.

18. A computing device comprising:
a display panel coupled to a display panel ground;
a touch sensor including a receive electrode and a transmit electrode overlaying the display panel, the transmit electrode being driven via a signal within a selected range of operating frequencies to measure a capacitance that changes responsive to touch input to the touch sensor, and one or more of the transmit electrode and the receive electrode being coupled to a touch sensor ground that is isolated from the display panel ground by one or more frequency-selective circuits configured to isolate the display panel ground and the touch sensor ground at the selected range of operating frequencies used to measure the capacitance;
a logic subsystem; and
a storage device storing instructions executable by the logic subsystem to:
display a user interface via the display panel,
receive data from the touch sensor that is transmitted between ground domains of the display panel ground and the touch sensor ground, and
update at least one displayable feature of the user interface based at least on the data received from the touch sensor.

19. The computing device of claim 18, wherein the touch sensor ground is connected to the display panel ground at a selected frequency that is higher than a data transfer frequency, and wherein the touch sensor is communicatively connected to the display panel to exchange data via an alternating current coupling across the ground domains of the touch sensor ground and the display panel ground.

20. The computing device of claim 19, wherein the data is encoded with a coding scheme prior to transmitting the data across the ground domains of the touch sensor ground and the display panel ground, the coding scheme generating a signal that is above the selected frequency.

* * * * *